United States Patent [19]

Kobayashi et al.

[11] Patent Number: 4,773,065

[45] Date of Patent: Sep. 20, 1988

[54] DATA FRAMING SYSTEM FOR TIME DIVISION MULTIPLEXING TRANSMISSION

[75] Inventors: Hiroshi Kobayashi, Tokyo; Hideaki Haruyama, Yokohama, both of Japan

[73] Assignee: Kabushiki Kaisha Toshiba, Kawasaki, Japan

[21] Appl. No.: 168

[22] Filed: Jan. 2, 1987

[30] Foreign Application Priority Data

Jan. 9, 1986 [JP] Japan .................................. 61-2368

[51] Int. Cl.$^4$ ............................ H04J 3/14; H04J 1/16
[52] U.S. Cl. ......................................... 370/67; 370/85
[58] Field of Search ................. 370/67, 13, 90, 94, 370/60, 96, 85, 86, 88, 56, 95, 100, 110.1; 340/825.5

[56] References Cited

U.S. PATENT DOCUMENTS

| | | | |
|---|---|---|---|
| 4,271,505 | 6/1981 | Menot et al. | 370/95 |
| 4,445,214 | 4/1984 | Reynolds et al. | 370/85 |
| 4,594,705 | 6/1986 | Yahata et al. | 370/67 |
| 4,630,264 | 12/1986 | Wah et al. | 370/85 |
| 4,667,613 | 6/1987 | Salmond et al. | 370/85 |
| 4,694,453 | 9/1987 | Kobayashi et al. | 370/85 |

OTHER PUBLICATIONS

Digest of Paper 82, 24th IEEE Computer Society International Conference, "CableNet: A Local Area Network Reservation Scheme", Kong et al., Feb. 22–25, 1982.

Primary Examiner—Douglas W. Olms
Assistant Examiner—Curtis Kuntz
Attorney, Agent, or Firm—Oblon, Fisher, Spivak, McClelland & Maier

[57] ABSTRACT

A central station and a plurality of local stations are coupled through a signal transmission path. Data signals addressed to local stations, to which terminal devices such as telephone sets are coupled, are transmitted over the signal transmission path on a time-division multiplexing basis. Each local station sends the data signal onto the signal transmission path at a timing depending on a measured transmission delay time of a signal on the signal transmission path between itself and the central station. One transmission frame consists of subframes of data signals addressed to the local stations and a window frame for transmission delay time measurement. A maximum network length depends on the time duration of the window frame. In order to extend the time duration of the window frame and to increase the maximum network length, data signals for the same terminal device coupled to a local station are multiplexed in one time slot of a subframe.

10 Claims, 10 Drawing Sheets

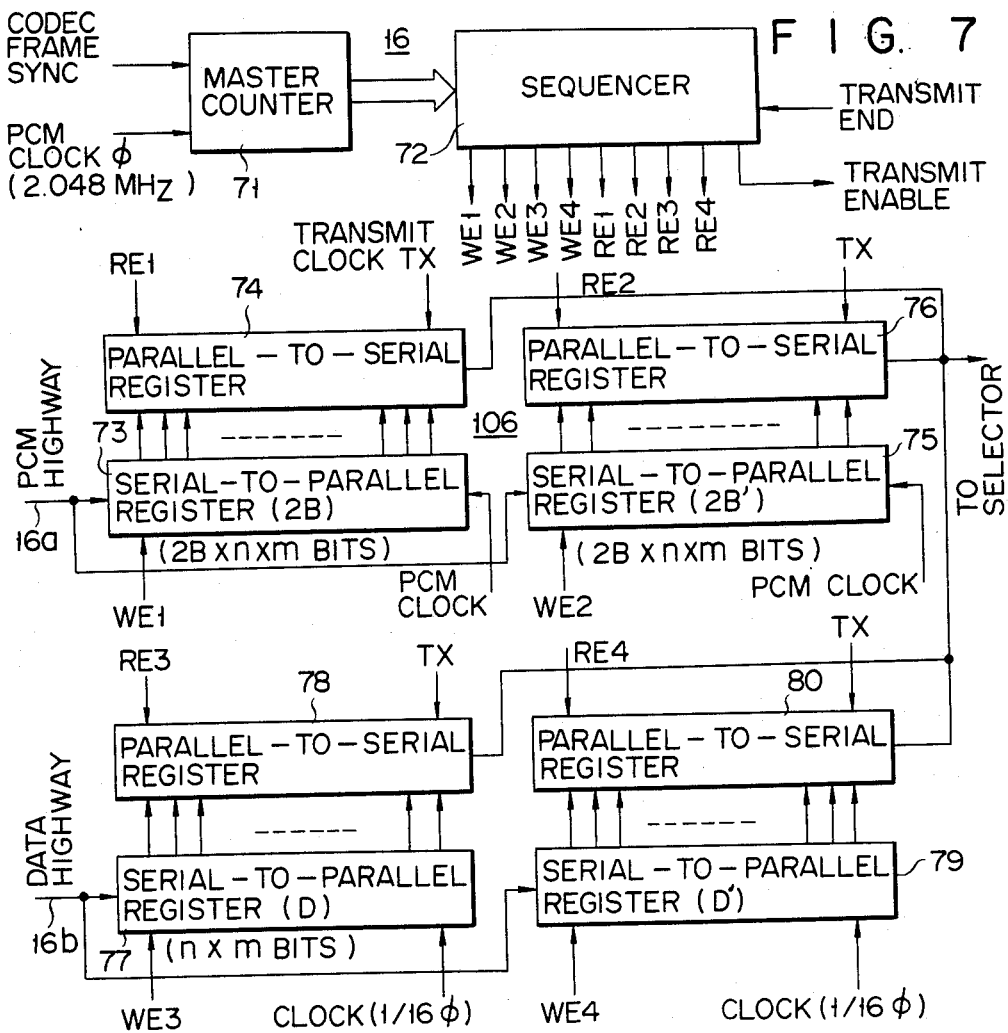
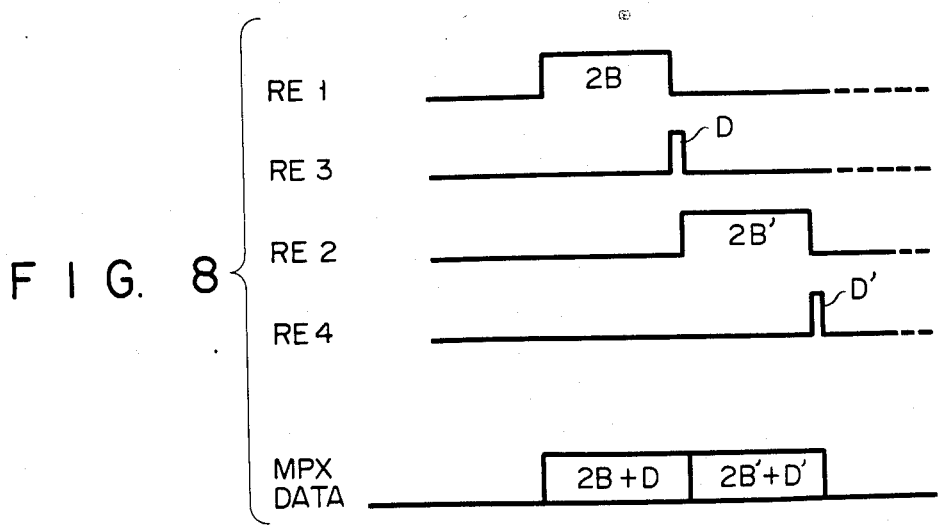

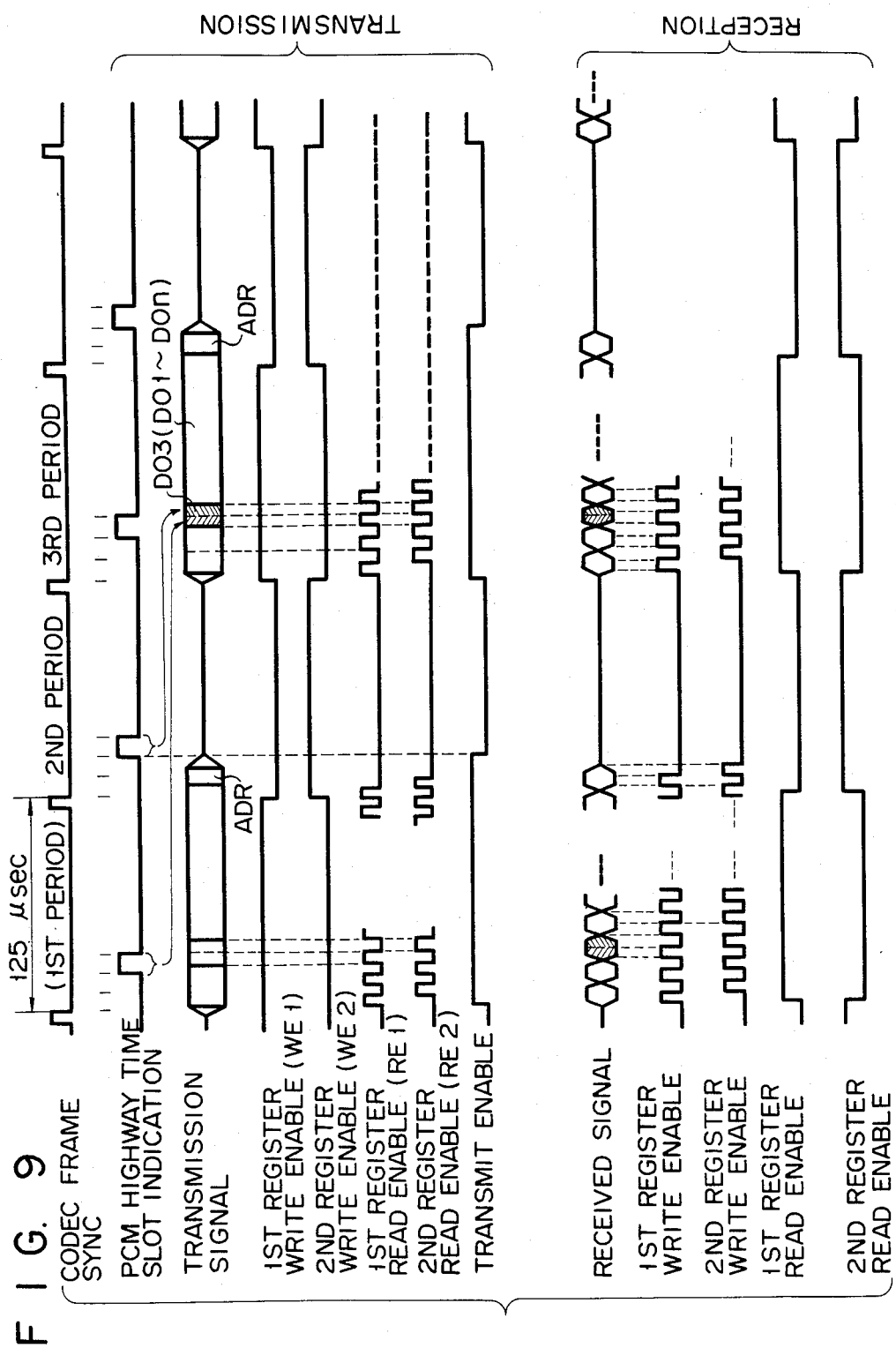

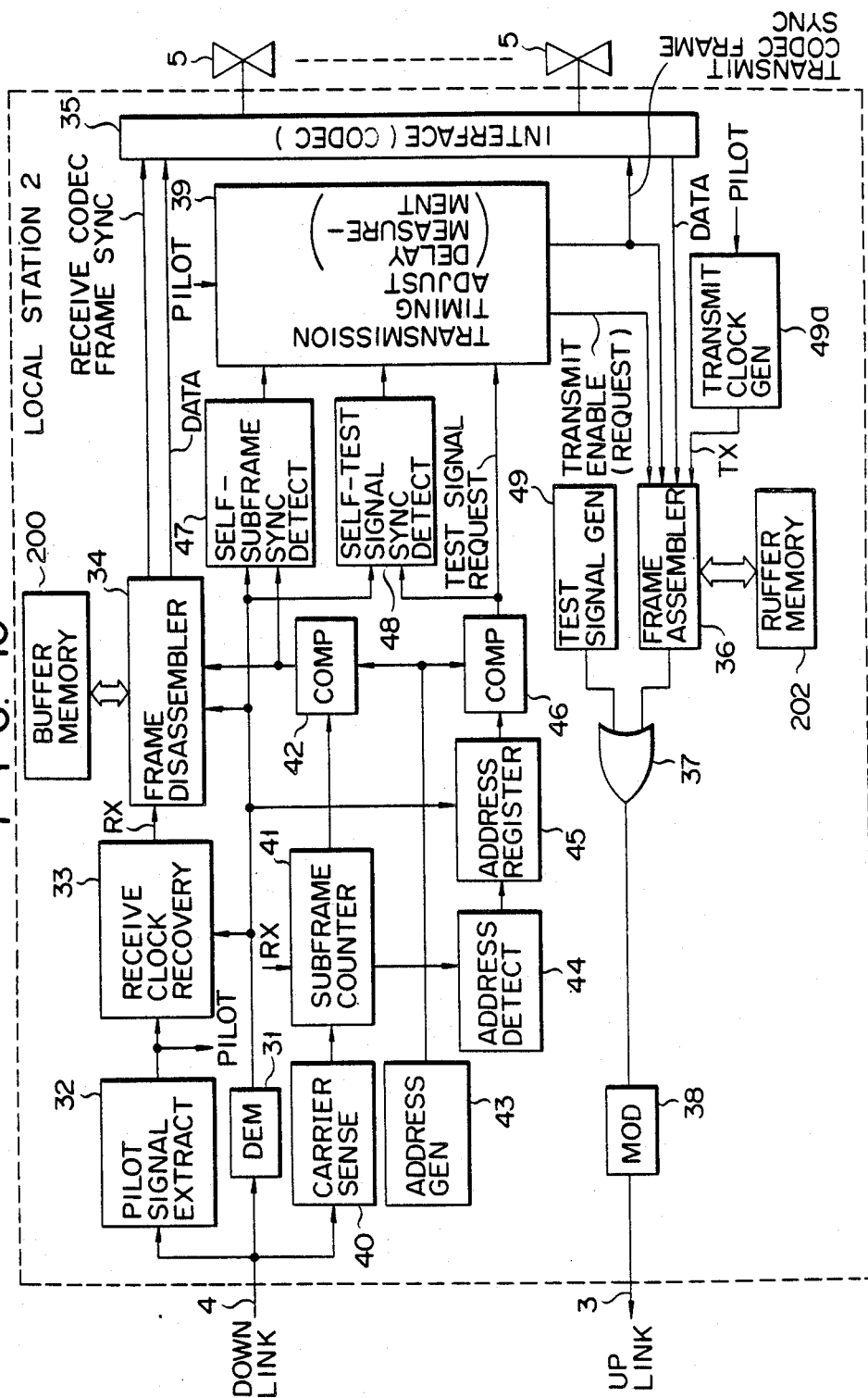

DATA FRAMING SYSTEM FOR TIME DIVISION MULTIPLEXING TRANSMISSION

Background of the Invention

The present invention relates to a time-division multiplexing data transmission system suitable for a communication network in which a central station and a plurality of local or remote stations are coupled through a common signal transmission path and, more particularly, to a data framing system in a time-division multiplexing network system.

When a communication network is constructed by coupling a plurality of terminals, such as telephone sets, to a PBX (Private Branch Exchanging equipment) it is generally difficult to directly couple the terminals to the PBX. In general, the terminals are placed in a plurality of buildings or on a plurality of floors even in one building.

A communication network has been realized in which a local station having concentration and distribution functions are provided for each building or each floor, and the local stations are coupled to a PBX (central station) through up and down links. A plurality of terminals, such as telephone sets, are coupled to each local station. Signals are transmitted from the respective local stations to the PBX on a time-division multiplexing basis. For this reason, a flexible network can be constructed.

In such a network, local stations are coupled at different positions on signal transmission paths (up and down links) extending from the central station. Therefore, transmission-path lengths between the central station and the local stations are different for each local station. Different transmission-path lengths mean different signal transmission delay times, i.e., different times required for signal transmission. In transmitting signals from a plurality of local stations to the central station through the common transmission path, it is very important to prevent transmission signals from the local stations from colliding each other. In order to prevent such collision, the signal transmission timing in each local station must be adjusted taking different transmission delay times for each local station into consideration.

However, if signal transmission is delayed simply considering the transmission delay time of each local station, utilization efficiency of the transmission path would be considerably degraded.

U.S. Pat. No. 4,594,705 issued on June 10, 1986; entitled "BUS-CONFIGURED LOCAL AREA NETWORK WITH DATA EXCHANGE CAPABILITY"; and assigned to the same assignee as this application discloses an improved system for adjusting signal transmission timings of a plurality of local stations. With this improved system, a central station sequentially sends a test signal to the local stations, and the local stations send the received test signal back to the central station. As a result, the central station measures a transmission delay time between itself and each local station, and provided transmission delay time information to each local station so as to adjust its signal transmission timing.

However, with this system, since the central station measures the transmission delay times of the respective local stations and controls their signal transmission timings, a great load is imposed on the central station. Delay time adjustment from the central station makes it difficult to increase the number of local stations in a network, resulting in poor flexibility of the network. When each local station sends back the test signal, its transmission timing may includes a quantum error caused by the operating states of the local station. Delay time measurement precision is thus degraded. In order to reliably prevent collision of signals from the local stations, some time margin must be considered.

Copending U.S. patent application Ser. No. 810,092 filed on Dec. 18, 1985; entitled "SYSTEM FOR ADJUSTING SIGNAL TRANSMISSION TIMING IN TIMEDIVISION MULTIPLEXING SIGNAL TRANSMISSION"; and assigned to the same assignee as this application discloses an improved time-division multiplexing network in which each local station measures a transmission delay time between itself and a central station, and each local station adjusts a transmission timing of a signal to the central station.

With this transmission system disclosed in this copending application, the central station requests transmission of a test signal to each local station, and sends back the test signals transmitted from the local stations to the corresponding local stations. Each local station detects a data signal addressed to itself, and transmits a test signal to the central station in response to the test signal transmission request. Each local station measures a transmission delay time from the time of the transmission of the test signal to the time of the reception of it sent back from the central station. Each local station then adjusts the transmission timing of a data signal to be transmitted to the central station in accordance with the measured transmission delay time.

A signal transmission path is constituted by up and down links. The central station transmits data signals (subframe signals) addressed to the respective local stations over the up link for each 1-frame period on a time-division multiplexing basis. One frame of the data signals consists of a data period for transmitting the data signals addressed to respective local stations followed by address data of a local station to which a test signal transmission is requested, and a subsequent window period for transmission delay time measurement. Local stations transmit data signals to the central station for each frame on the time-division multiplexing basis. One frame of data signals transmitted from local stations consists of a data period followed by a window period. A local station receiving a test signal transmission request transmits the test signal during this window period.

Time duration Tw of the window period in the 1-frame period must be set longer than a sum of td max, tu max, and tp in order to allow a local station to transmit and receive a test signal without collision with data signals. "td max" indicates a maximum delay time on the down link involved in signal transmission from the central station to the remotest local station, "tu max" indicates a maximum delay time on the up link, and "tp" indicates a time duration of the test signal. The data length of each frame is determined in accordance with the frame configuration and the number of installed lines (the number of terminals, such as telephone sets, coupled to the communication network). "td max+tu max", that is, a maximum network length is also determined depending on a window length.

For example, if the window length=284 bits and tp=10 bits, (td max+tu max)≦(284−10) bit times.

If one bit time=1/12.288 MHz=81.4 nsec, and a coaxial cable using highly foamed polyethylene (transmission rate=3.83 ns/m) is used, the maximum network length is 2.91 km.

This maximum network length is sufficiently longer than an ordinary network length for the PBX (0.6 to 1 km). However, this is insufficient for a broadband network such as MAN (metropolitan area network) or CA (community antenna) TV network.

The aforementioned transmission system may be applied to the broadband network if the number of subframes in one frame is decreased. However, a decrease in the number of subframes results in a decrease in the number of lines (telephone terminals) which can be coupled to the network. In usual PCM data transmission, 8 bits per unit data are required. In contrast to this, in AD (advanced differential) PCM Codec, unit data requires only 4 bits, and hence, a subframe length can be shortened. However, ADPCM hardware is expensive. Alternatively, for example, if multi-value modulation, e.g., four-phase PSK (phase shift keying) is used, the subframe length can be shortened but expensive hardware becomes necessary.

SUMMARY OF THE INVENTION

It is an object of the present invention to provide an improved time-division multiplexing communication network system which comprises a central station and a plurality of local stations coupled thereto through a common signal transmission path.

It is another object of the present invention to provide a data signal framing (transmission) system which can extend a maximum network length and is used for a time-division multiplexing communication network wherein each of local stations coupled to a central station through a common signal transmission path measures a transmission delay time between itself and the central station, and adjusts a transmission timing of a data signal to the central station.

A communication network system of this invention comprises a central station; a plurality of local stations to each of which at least one terminal device is coupled, and a signal transmission path connected between the central station and the local stations. The central station is arranged to send information signals addressed to terminal devices coupled to the local stations onto the signal transmission path during one transmission frame period on a time-division multiplexing basis. Information signals for one local station form one subframe having at least one time slot. Each of the local stations is arranged to send an information signal onto the signal transmission path toward the central station at a timing depending on a measured transmission delay time of the signal transmission path between the local station and the central station.

To achieve the objects, the central station and local stations are each arranged to multiplex information signals for one terminal device, which are generated in a plurality of periods of a fundamental signal for time-division transmission of information signals, in one time slot in a subframe, and send the multiplexed information signals onto the signal transmission path.

BRIEF DESCRIPTION OF THE DRAWINGS

FIG. 7 is a block diagram of a buffer memory in the central station;

FIG. 8 shows READ ENABLE signals for registers in FIG. 7;

FIG. 9 is a timing chart in the central station for explaining the operation of the signal transmission system of the present invention;

FIG. 10 is a block diagram of a local station; and

DETAILED DESCRIPTION OF THE PREFERRED EMBODIMENT

Figure 1:
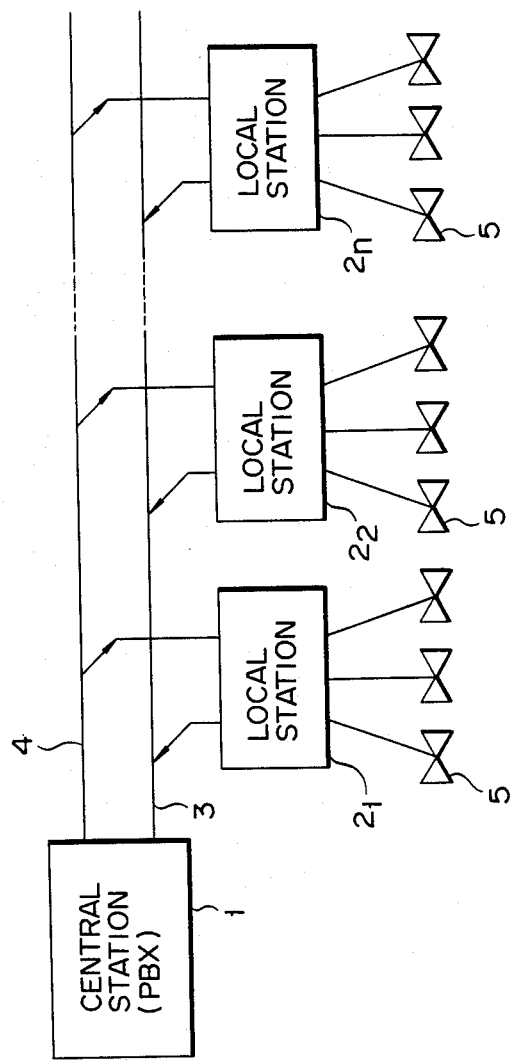
FIG. 1 schematically shows a communication network to which a signal transmission system of the present invention is applied.

The present invention will be described hereinafter with reference to a PBX network. As shown in FIG. 1, central station 1 comprises a PBX and a plurality of local stations $2_1, 2_2, \ldots, 2_n$ having concentration and distribution functions and arranged at remote locations. In this case, a signal transmission bus having up link 3 and down link 4 extends from central station 1, and local stations $2_1, 2_2, \ldots, 2_n$ are connected at arbitrary positions of the bus. Therefore, a signal transmission time between a given local station and the central station depends on the position at which the local station is coupled to the transmission path. To each local station are connected terminal devices 5 such as telephone sets, data processing devices, and the like. The number of terminal devices connected to each local station need not be the same. An address is assigned to each local station.

Figure 2:
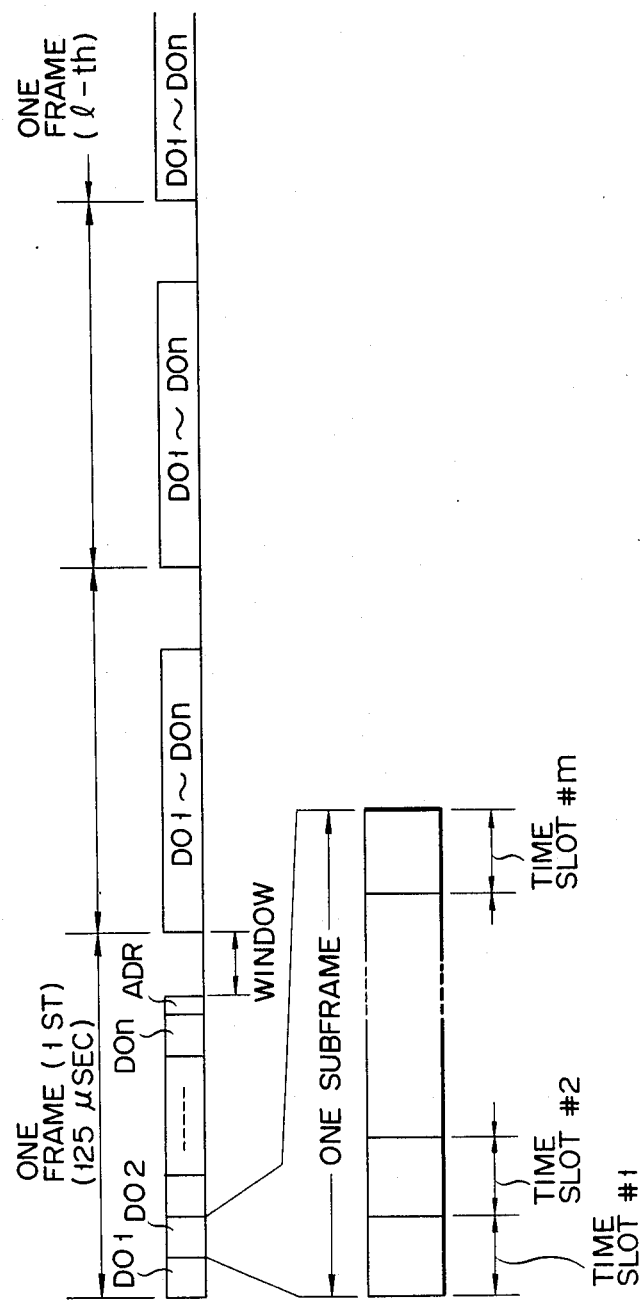
FIG. 2 is a format for explaining the signal transmission system in the communication network in FIG. 1, disclosed in the aforementioned prior application, in order to help understanding of the signal transmission system of the present invention.

Prior to the description of the signal transmission system of the present invention, the signal transmission system disclosed in the aforementioned prior application will be described with reference to FIG. 2. Central station 1 sends on down link 4 transmission data signals (subframe data signals) DO1, DO2, ..., DOn addressed to local stations $2_1, 2_2, \ldots, 2_n$ during a 1-frame period in the address order on a time-division multiplexing basis. Immediately after subframe data signal DOn, an address data signal ADR designating one of local stations is transmitted. Each frame of data signals transmitted from central station 1 consists of a data period including subframe data signal DO1 to DOn and address data signal ADR, and a window period, which is in non-signal condition and has a predetermined time duration, for measuring a transmission delay time between each local station and the central station. Each subframe is divided into time slots corresponding to the number of terminal devices coupled to a corresponding local station, and each time slot is assigned to a corresponding terminal device 5. FIG. 2 shows an example in which, m terminal devices 5 are coupled to the second local station. As is apparent from FIG. 2, subframe data signal for each terminal device 5 or each local station is transmitted once per 1-frame period. For this reason, the duration of the window period is limited, and the maximum network length is also limited.

The main feature of the signal transmission system of the present invention resides in multiplexing data signals to be transmitted for each terminal device in a plurality of frame periods (FIG. 2) in new 1 frame (1 multi-frame), and provision of a window period following the multi-framed data signals. Thus, the window period can be set to a multiple of the number of multiplexed frames, and as a result, the maximum network length can be extended.

A transmission data multi-framing system of the present invention will now be described with reference to FIG. 3. As shown in FIG. 3(A), each frame format of the multi-framing system is the same as that in FIG. 2, and consists of a data period including time-division multiplexed subframe data signals DO1 to DOn addressed to local stations $2_1$ to $2_n$ and an address data signal ADR for designating one of local stations, and a subsequent window period. As shown in FIG. 3(B), one subframe of data signal for one local station consists of m time slots #1 to #m in accordance with the number m ($\geq 1$) of terminal devices (telephone sets) coupled thereto. At the beginning of the subframe, 1-bit dummy data and a 2-bit sync signal are located. The sync signal is not essential to the present invention.

Figure 3:
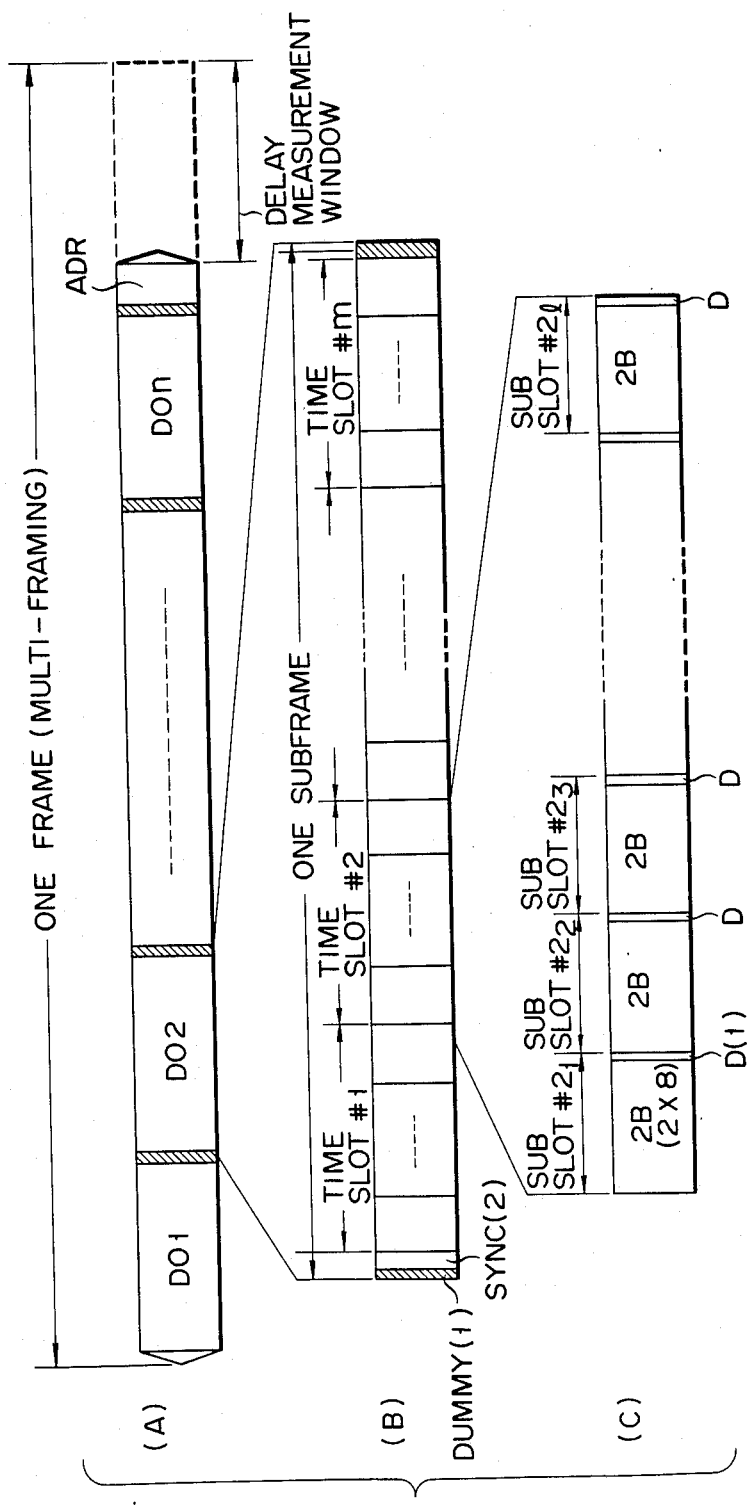
FIG. 3 is a frame format of data signals transmitted over a down link from a central station to local stations in the signal transmission system of the present invention.

With the multi-framing system of the present invention, as shown in FIG. 3(C), a time slot assigned to one telephone set is divided into a plurality of subslots #21 to #2l ($l \geq 1$). l indicates the number of multiplexing of data signals for one telephone set. If 4-frame data signals shown in FIG. 2 are multiplexed in one frame in accordance with the format shown in FIG. 3, l=4. FIG. 3(C) shows that two audio channels B (8 bits) and single control channel D (1 bit) are assigned to each subslot in order to provide compatibility with an ISDN (integrated services digital network). The compatibility with the ISDN is not essential to the present invention.

Figure 4:
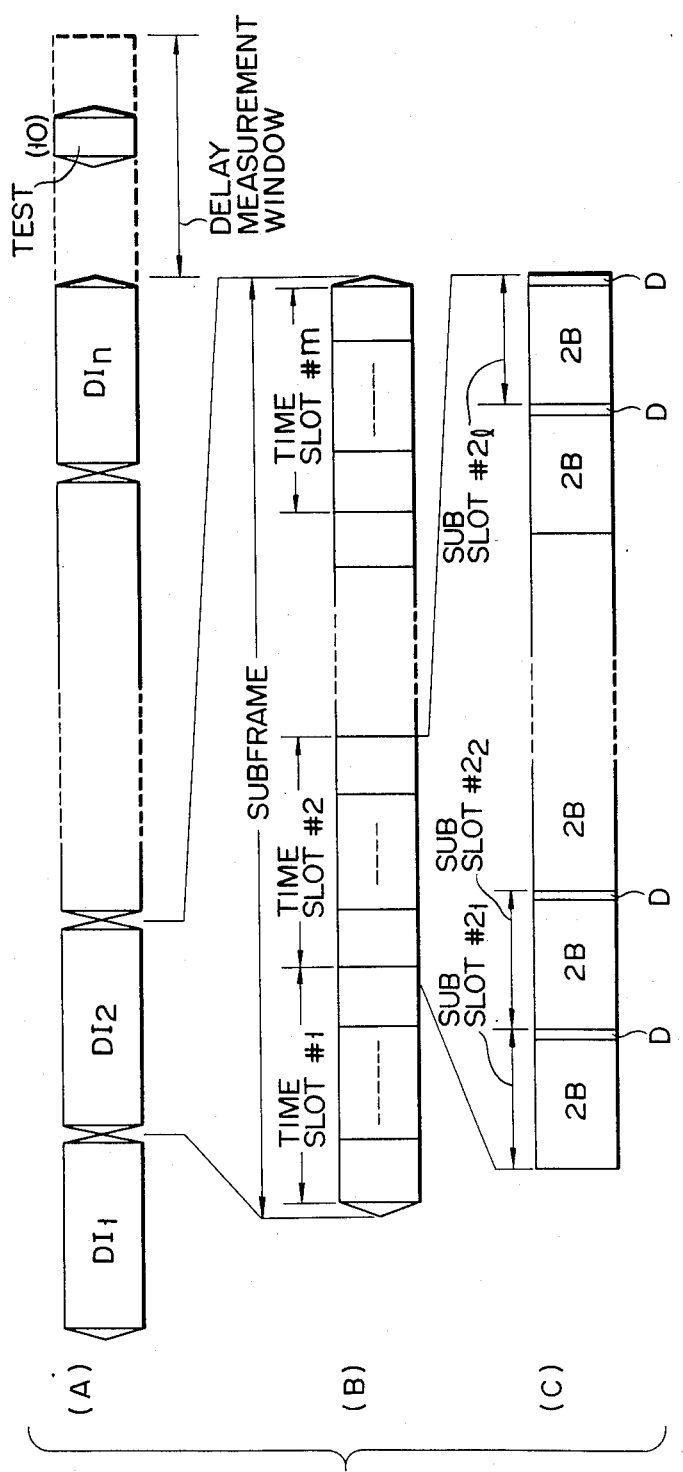
FIG. 4 is a frame format of data signals transmitted over an up link from local stations to the central station.

FIG. 4(A) shows a frame format of data signals transmitted from local stations $2_1$ to $2_n$ to central station 1. This frame consists of time-division multiplexed subframe data signals DI1 to DIn from local stations $2_1$ to $2_n$ and a subsequent delay time measurement window. In the window period a test signal TEST is transmitted from the local station specified by address data ADR shown in FIG. 3(A) and is adapted for measuring a transmission delay time between the central station and the local station. As shown in FIG. 4(B), a subframe of the data signal has m time slots #1 to #m assigned to m telephone terminals in the same manner as in FIG. 3(B). The time slot assigned to each telephone terminal consists of l subslots, and each subslot carries two audio channels B and one control channel D.

For example, if an audio sampling period (one frame period in FIG. 2) is 125 μsec, multiplexing number l of frames is 4, and the number of subframes is the same as that in FIG. 2, 284×4=1136 bit times can be assigned to the window period. If tp=10 bits, td max+tu max=1126 bit times=91.6 μsec. This means a maximum network length of 11.96 km, which is four times the network length described in connection to FIG. 2.

Figure 5:
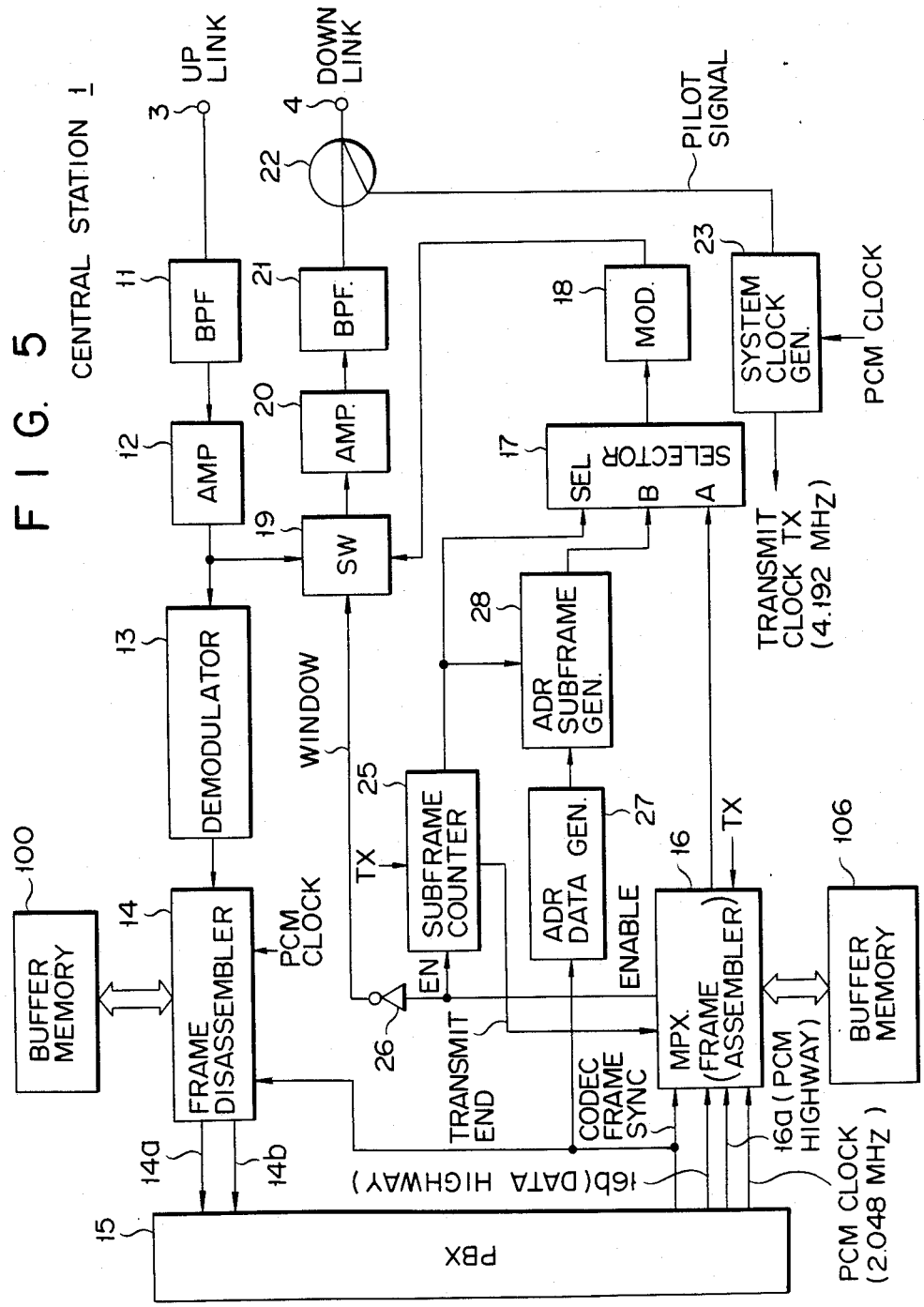
FIG. 5 is a block diagram of the central station comprising a PBX.

The arrangement of central station 1 will now be described with reference to FIG. 5. In central station 1, signals (FIG. 4(A)) transmitted over up link 3 from local stations $2_1$ to $2_n$ are applied to bandpass filter 11 so that unnecessary frequency components are removed, and then amplified to a predetermined magnitude by amplifier 12. The received signals are demodulated by demodulator 13, and then applied to buffer memory 100 through distributor (frame disassembler) 14. Disassembler 14 and buffer memory 100 disassemble the signals transmitted from local stations $2_1$ to $2_n$ in response to a codec frame sync signal (8 kHz; 125-μsec period), and also disassemble 1 data signals (2B+D) multiplexed in each time slot so that PCM data B and control data D are applied to PBX 15 through PCM highway 14a and data highway 14b, respectively.

In PBX 15, the data signals from local stations are subjected to exchange or switching processing. Audio signals B and control data D from PBX 15 are applied to multiplexer (frame assembler) 16 through PCM highway 16a and data highway 16b, respectively. Multiplexer 16 receives a codec frame sync signal and 2.048-MHz PCM clock signal from PBX 15, and 4.192-MHz transmit clock signal Tx from system clock generator 23 responsive to the PCM clock signal. Multiplexer 16 assembles the audio signals and the control signals in the format shown in FIG. 3 in cooperation with buffer memory 106. A transmission signal from multiplexer 16 is supplied to modulator 18 through selector 17 and is modulated by a predetermined modulation scheme, e.g., FSK (frequency shift keying).

The modulated data signal from modulator 18 is applied to switch circuit 19 together with the received data signal from amplifier 12. Switch circuit 19 selectively applies to amplifier 20 one of output signals of modulator 18 and amplifier 12 in response to a WINDOW signal which is an inverse signal of a TRANSMIT ENABLE signal which is generated from multiplexer 16 in synchronism with the codec frame sync signal. The output signal of amplifier 20 is transmitted onto down link 4 through bandpass filter 21 and OR gate 22. Switch circuit 19 sends an output signal of amplifier 12 (during the window period of one frame), i.e., a test signal transmitted from a designated local station over up link 3, onto down link 4.

System clock generator 23 generates a 245.76-MHz pilot signal together with transmit clock Tx in response to the PCM clock. The pilot signal is normally sent onto down link 4 through OR gate 22.

Selector 17 selects subframe data signals DO1 to DOn for local stations $2_1$ to $2_n$ during a data signal transmission period of the one-frame period and subsequently selects an ADR signal for application to modulator 18.

Upon reception of the codec frame sync signal shown in FIG. 9 from PBX 15, multiplexer 16 generates a TRANSMIT ENABLE signal shown in FIG. 9 to enable subframe counter 25 to count transmit clocks Tx. Subframe counter 25 causes selector 17 to select transmission signals DO1 to DOn from multiplexer 16 and to supply them to modulator 18. Thus, the subframe data transmission to local stations $2_1$ to $2_n$ is started.

ADR data generator 27 is provided for generating ADR data (an address number of a local station). Generator 27 is enabled by the codec frame sync signal, and generates ADR data which is incremented for each frame transmission. ADR data is supplied to ADR subframe generator 28, which forms an ADR subframe signal in a predetermined format. Upon counting a predetermined number of bits of subframe data DO1 to DOn to be transmitted, i.e., when application of subframe data signals DO1 to DOn to selector 17 is completed, subframe counter 25 applies ADR subframe data to selector 17 and causes selector 17 to apply the ADR subframe data to modulator 18. Subframe counter 25 applies a TRANSMIT END signal of representing the end of transmission of the subframe data signals DO1 to DOn and- ADR data signal to multiplexer 16, so that the TRANSMIT ENABLE signal goes low.

Multiplexer 16 multiplexes data signals (2B+D) to be transmitted to each terminal device in one-transmission frame period, together with buffer memory 106. The data multiplexing method will be described with reference to FIGS. 6 and 7. A description will be made of the case where the multiplexing number l is 2.

Figure 6:
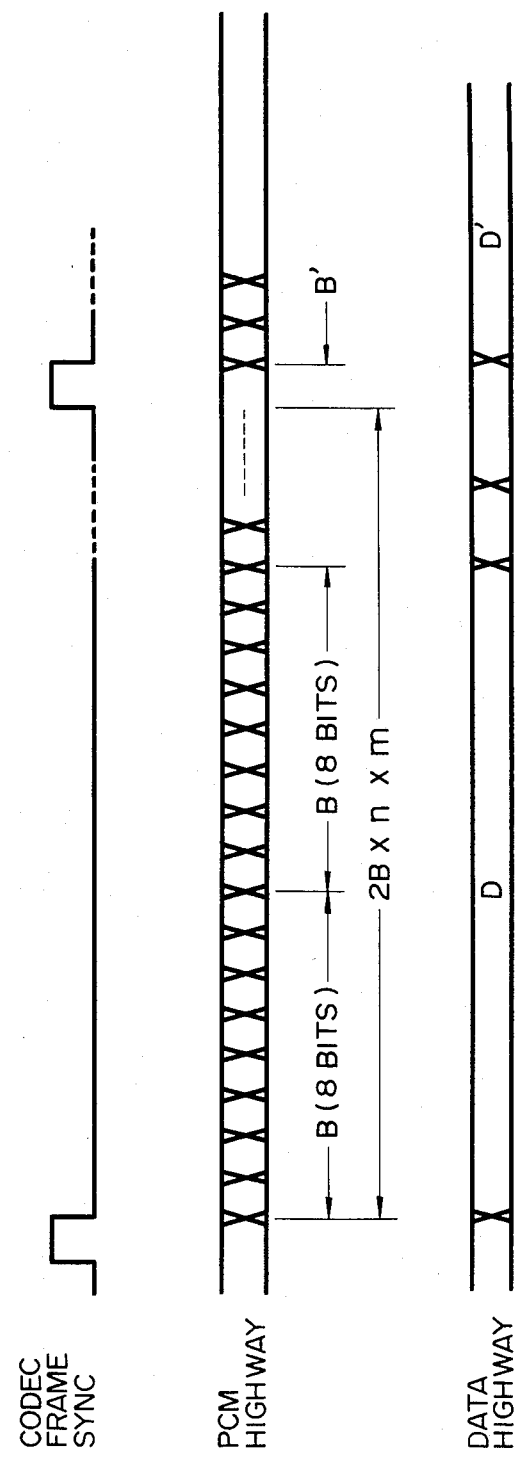
FIG. 6 shows a codec frame sync signal, a PCM highway signal, and a control data highway signal from the central station.

FIG. 6 shows the codec frame sync signal from PBX 15, audio signal B on PCM highway 16a, and control data B on control data highway 16b. When two channels are used for transmission of audio data B, $2B \times n \times m$ bits of audio data are transmitted within one period (125 μsec) of the codec frame sync signal. n indicates the number of local stations 2, and m indicates the number of telephone terminals 5 supported by each local station. 1-bit control data D is transmitted per 2B (16) bits of audio data. Audio data B and control data D over two periods of the codec frame sync signal are multiplexed in one transmission frame.

FIG. 7 shows an arrangement of multiplexer 16 and buffer memory 106. Buffer memory 106 is comprised of shift registers 73 to 80. The number of shift registers used in buffer memory 106 varies with the multiplexing number l. Buffer memory 106 is preferably formed of a RAM (random access memory).

The codec frame sync signal and PCM clock signal from PBX 15 are applied to master counter 71, which drives sequencer 72. Sequencer 72 generates WRITE ENABLE signals WE1 to WE4 and READ ENABLE signals RE1 to RE4 for shift registers 73 to 80 in addition to the TRANSMIT ENABLE signal.

Audio data B on PCM highway 16a from PBX 15 is applied to a pair of shift registers 73 and 75 provided in accordance with the multiplexing number of 2. These shift registers each have a capacity of $2B \times n \times m$ bits. When corresponding WRITE ENABLE signals WE1 and WE2 go high, audio data B is loaded to shift registers 73 and 75. WRITE ENABLE signals WE1 and WE2 alternately go high over one period of the codec frame sync signal. Therefore, in the first period of the codec frame sync signal shown in FIG. 6, audio data B is serially loaded to first shift register 73 in response to PCM clock $\phi$, and in the next period of the codec frame sync signal, audio data B is serially loaded to second shift register 75 in response to the PCM clock. Upon completion of the loading of audio data B to shift register 73, audio data B is parallel-transferred to shift register 74. Similarly, audio data B loaded to shift register 75 is transferred to shift register 76 at a time. Although not shown, transfer instructions are generated by sequencer 72.

Control data D on control data highway 16b is applied to third and fourth shift registers 77 and 79. Control data D is loaded to the shift registers when corresponding WRITE ENABLE signals WE3 and WE4 go high. Third and fourth shift registers 77 and 79 each may have a capacity of $n \times m$ bits. A shift clock applied to registers 77 and 79 may be of a frequency 1/16 that of PCM clock $\phi$. WRITE ENABLE signals WE3 and WE4 to registers 77 and 79 alternately go high in synchronism with the codec frame sync signal. Upon completion of loading of control data D to registers 77 and 79, control data D are parallel-loaded to shift registers 78 and 80 from registers 77 and 79, respectively.

READ ENABLE signals RE1 and RE2 are applied to shift registers 74 and 76 in addition to transmit clock Tx. Audio data B stored in registers 74 and 76 are read out therefrom in response to transmit clock Tx when the corresponding READ ENABLE signal is high. Shift registers 78 and 80 also receive READ ENABLE signals RE3 and RE4 in addition to transmit clock Tx, respectively. Control data D stored in registers 78 and 80 are read out therefrom in response to transmit clock Tx when the corresponding READ ENABLE signal is high. Data (2B+D), (2B+D) read out from registers 74, 76, 78, and 80 are applied to selector 17.

FIG. 8 is a timing chart of READ ENABLE signals RE1 to RE4 applied to registers 74, 76, 78, and 80, and transmission data 2B+D multiplexed over two frames.

FIG. 7 shows the arrangement of the buffer memory when the number l of frames to be multiplexed is 2. When the number of frames to be multiplexed is 4, four register pairs (73, 74; 75, 76) for audio data are provided. This is true for the registers for control data D.

The transmission and reception operations in the central station will be described with reference to FIG. 9. For the sake of simplicity, signal communication between central station 1 and a third local station will be mainly described below.

As described above, the codec frame sync has a period of 125 μsec. In synchronism with the codec frame sync signal, PCM audio data B is transmitted from PBX 15 over the PCM highway, as shown in FIG. 6. A PCM highway time slot indication signal is adapted to monitor to which local station audio data B present on the PCM highway is addressed. In FIG. 9, the time slot indication signal indicates that audio data addressed to the third local station is being transmitted over the PCM highway. WRITE ENABLE signals WE1 and WE2, READ ENABLE signals RE1 and RE2, and the TRANSMIT ENABLE signal for shift registers 73 to 76 for audio data shown in FIG. 7 are generated in synchronism with the codec frame sync signal, as shown in FIG. 9. Since WRITE ENABLE signal WE1 is high during the first period of the codec frame sync signal, the audio data signals addressed to all the local stations are written into first shift register 73, and then transferred to shift register 74. Shift register 73 is made ready to receive audio data in the third period. In the second period, since WRITE ENABLE signal WE2 goes high, the audio data addressed to all the local stations are written into second shift register 75, and are then transferred to shift register 76. Shift register 75 is brought in a standby state for receiving audio data in the fourth period. In the third period of the codec frame sync signal, since READ ENABLE signals RE1 and RE2 for registers 74 and 76 alternately go high, it will be understood that audio data addressed to the third local station in the first and second periods are multiplexed in one time slot of a subframe, as can be seen from the transmission signal. As a result of multiplexing two frames, the data signal transmission to the local station is performed once per two periods of the codec frame sync signal. Generally, when the multiplexing number of frames is l, data signal transmission is performed once per l periods of the sync signal.

The timing chart in FIG. 9 is depicted under the assumption that each local station has one telephone terminal. The duration of the time slot indication signal depends on the number of telephone terminals coupled to each local station. The time duration of the transmission signal shown in FIG. 9 does not coincide with one period of the codec frame sync signal, since the frequency of PCM clock $\phi$ is different from that of transmit clock Tx. More specifically, a write speed at which PCM audio data is written into registers 73 and 75 is lower than a readout speed at which audio data is read out from registers 74 and 76.

The multiplexed data signal transmitted from a local station is disassembled by frame disassembler 14 and buffer memory 100. Frame disassembler 14 and buffer memory 100 have substantially the same arrangements as those of frame assembler 16 and buffer memory 106. Buffer memory 100 has register pairs similar to the first register pair (73, 74) and the second register pair (75, 76) in buffer memory 106. In this case, it is required that first and second WRITE ENABLE signals should change in level in the same manner as READ ENABLE signals RE1 and RE2 in buffer memory 106, and READ ENABLE signals in the same manner as WRITE ENABLE signals WE1 and WE2.

An arrangement of a local station will now be described with reference to FIG. 10. A data signal transmitted over down link 4 is applied to demodulator 31 to be demodulated. Pilot signal extract circuit 32 is provided which extracts the pilot signal from the reception signal. The output of demodulator 31 is connected to receive clock recovery circuit 33, which recovers receive clocks Rx phase-locked with the pilot signal from the output signal of demodulator 31. Frame disassembler 34 and buffer memory 200 disassemble subframe data addressed to the self station in response to receive clock Rx. Frame disassembler 34 applies disassembled data and the codec frame sync signal to interface (codec) 35 to which terminal devices 5 are coupled. Interface 35 applies data signals from terminal devices 5 to frame assembler 36 in response to the transmission codec frame sync signal provided from transmission timing adjust circuit 39. Frame assembler 36 multiplexes, together with buffer memory 202, data signals of a terminal device 5 over a plurality of periods of the codec frame sync signal in one time slot in response to a TRANSMIT ENABLE (REQUEST) signal from transmission timing adjust circuit 39 and transmit clock (4.192 MHz) Tx phase-locked with the pilot signal from transmit clock generator 49a. An output signal of frame assembler 36 is applied to modulator 38 and is modulated by the FSK method.

Transmission timing adjustment of subframe data in a local station will be described. Carrier sense circuit 40 monitors down link 4. Upon detecting incoming modulated data signals, sense circuit 40 issues a carrier sense signal to subframe counter 41. Counter 41 is enabled by the carrier sense signal to count receive clocks Rx. The count output of counter 41 is applied to comparator 42. Counter 41 is also connected to address detector 44, which issues an address detection signal at a reception timing of an ADR subframe. In response to the address detection signal, address register 45 fetches address data in the ADR subframe which is being received. The output of address register 45 is coupled to comparator 46. Address generator 43 is provided to provide address number data assigned to the local station. Address generator 42 is coupled to comparators 42 and 46.

Comparator 42 compares the count output of subframe counter 41 with the address number set in address generator 43, to issue a self-subframe detection signal at the reception timing of the subframe data addressed to itself in subframe data DO1 to DOn being transmitted to local stations $2_1$ to $2_n$. The self-subframe detection signal enables frame disassembler 34 to disassemble the self-subframe data. The disassembled data is supplied to terminal devices 5 through interface (codec) 35. The output of comparator 42 enables self-subframe sync detector 47 to detect a sync signal included in the self-subframe data. An output signal of detector 47 is applied to transmission timing adjust circuit 39.

Comparator 46 compares address data in the ADR subframe loaded to address register 45 with the address number set in address generator 43. When a coincidence is detected, comparator 46 outputs a test signal TRANSMIT REQUEST signal, which is coupled to transmission timing adjust circuit 39 and test signal generator 49. The output of comparator 46 enables self-test signal sync detector 48 to detect a sync signal in a test signal which is sent from the self station and sent back from central station 1. A self-test signal sync detection signal of detector 48 is applied to transmission timing adjust circuit 39. Sync detectors 47 and 48 are arranged to detect the transition from "1" to "0" of bit pattern "10" of the sync signal.

Test signal generator 49 is enabled by the test-signal TRANSMIT REQUEST signal, to start transmission of a test signal subframe of a predetermined format. The test signal subframe is transmitted during the window period. Timing adjust circuit 39 may be arranged as disclosed in the aforementioned prior application.

Buffer memories 200 and 202 are associated with frame disassembler 34 and frame assembler 36, respectively, according to the present invention. These buffer memories may be configured in the same manner as buffer memory 106 in central station 1. However, the capacity of each buffer memory may be smaller than that of the shift register in the central station, and depends on number m of telephone terminals coupled to interface 35. The capacity of a shift register used for audio data B may be 2B×m bits.

Figure 11:
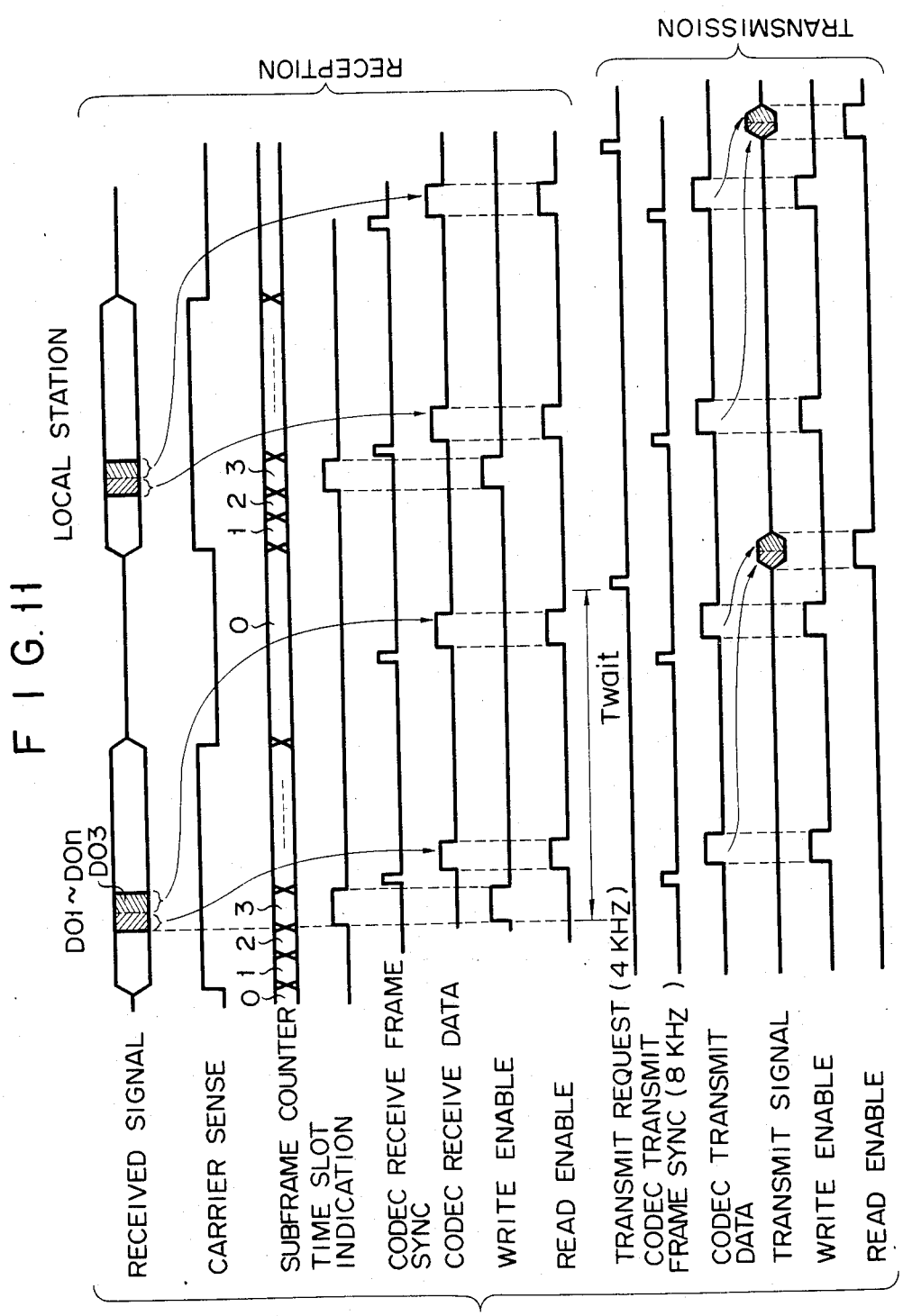
FIG. 11 is a timing chart in the local station for explaining the signal transmission system.

Disassembling of received multiplexed data signals and multiplexing of data signals for transmission at each local station will be described with reference to the timing chart shown in FIG. 11. As shown in FIG. 9, frame-multiplexed transmission data DO1 to DOn are received. Two blocks of data addressed to an identical terminal device of the third local station, which are to be transmitted over two periods of the codec frame sync signal, are multiplexed in one subslot as described above. When the third local station receives transmission data DO1 to DOn from the central station, carrier sense circuit 40 outputs a carrier sense signal, and subframe counter 41 thus begins to count subframes of the transmission data. When the third subframe is detected, a WRITE ENABLE signal is generated during the period of the corresponding subframe. As a result, multiplexed data block of the third subframe is loaded to the first shift register. Upon completion of data loading, the received data is transferred to the second shift register. When data addressed to the third local station is received, a codec receive frame sync signal is generated. This signal has the same period (125 μsec) as that of the sync signal in the central station. In synchronism with the codec receive frame sync signal, a READ ENABLE signal for the second register is generated. This signal has a time duration corresponding to each multiplexed data block. Thus, the first data block is read out from the second shift register. In response to the next codec receive frame sync signal, the next READ EN- ABLE signal is generated, and as a result, the next data block is read out, as shown in FIG. 11. The frequency of shift clock Rx is different from that of a shift clock used for the data read operation as in the central station. Since the READ ENABLE signal is generated twice from the reception of the third subframe data until the reception of the next third subframe data, two multiplexed data blocks are disassembled. The timing chart of FIG. 11 corresponds to a case where data multiplexing number l is 2 as in FIG. 9.

The frame-multiplexing operation in the case of data transmission to the central station will be described below. In each local station, delay measurement circuit 39 generates a TRANSMIT REQUEST signal (4 kHz) after a delay of time Twait from a detection timing of a sync signal in a self-subframe data signal of data signals received through down link 4. Delay measurement circuit 39 supplies a transmit codec frame sync signal (8 kHz) to interface (codec) 35. In response to this, interface 35 supplies transmission data of a first block from terminal device 5 (in this example, one telephone set is provided) to frame assembler 36 in synchronism with the frame sync signal. In response to the codec frame sync signal, a WRITE ENABLE signal is generated from the sequencer of buffer memory 202, so that data from device 5 is written into a first shift register. In response to the next frame sync signal, a second data block sent from interface 35 is written into the first register. First and second data blocks written into the first shift register are parallel-transferred to a second shift register. As a result, preparation for transmitting two multiplexed data blocks is completed. After a time of Twait a TRANSMIT ENABLE signal is supplied from delay measurement circuit 39, and a READ ENABLE signal is supplied to the second shift register, so that multiplexed data blocks are sent onto up link 3. The frequency of the shift clock for writing data into the first shift register is different from that for reading out data from the second shift register. It will be understood that since the frequency of the codec frame sync signal is twice that of the TRANSMIT ENABLE signal, two data blocks from the identical terminal device can be multiplexed in one time slot. The capacity of the shift register for audio data used in buffer memory 202 may be 2B×l bits (l indicates the multiplexing number). The number of register pairs depends on the number of terminal devices 5 supported by interface 35.

As described above, data addressed to an identical terminal device are multiplexed over a plurality of periods of the codec frame sync signal, so that the window period can be extended to times of to multiplexing number l compared with that disclosed in the prior application, thereby extending the network length l times.

The present invention is not limited to the above embodiment. In the above embodiment, a pilot signal is transmitted from the central station to the local stations to establish synchronization between the central station and the local stations. Alternatively, a clock signal recovered from the reception signal sent from the central station in each station may be supplied to a PLL (Phase Locked Loop) to generate a sync signal of a high frequency.

In the above embodiment, 2B+D data is assigned to each subslot in consideration of the compatibility with the ISDN. However, only one audio channel can be assigned to each subslot. Control data D can be communicated between the central station and the local stations through a common signal line. This increases a transmission capacity for the B channel. As for the B channel, a demand assign method may be adopted wherein a local station requests a time slot, and the central station assigns a time slot to the local station.

In the above embodiment, one subframe is assigned to (one local station) within one frame period. A plurality of subframes in one frame may be assigned to a local station which is specially used for purposes of real-time or non-delay property. Conversely, a subframe may be assigned to a local station once per several frames, which handles waiting-call information, such as packet data. As a modulation method, two-phase or four-phase modulation (PSK) method may be used.

In the above embodiment, a sampling rate (125 μsec) of audio data is used as a fundamental period, and data in a plurality of fundamental periods are multiplexed in one frame. The fundamental period for multiplexing is not limited to the sampling period of audio data. Since a test signal is sent back from the central station, each local station may be arranged to adjust the level of its transmission signal from the reception level of the test signal.

As the transmission path, a transmission path using a coaxial cable as in CATV and broadband networks, an optical transmission path, a baseband transmission path, and the like can be adopted. Signals on up and down links may be frequency-separated to allow bi-directional transmission using a single transmission path. The length of the subframe need not be constant.

In the above embodiment, each local station is arranged to measure a transmission delay time and to adjust the data transmission timing. However, the central station may be arranged to measure the transmission delay time for each local station. In this case, delay time information is transmitted from the central station to each local station, and each local station adjusts the transmission start timing in accordance with the delay time information.

What is claimed is:

1. A communication network system comprising:
   a central station having a PBX which generates a codec frame sync signal having a plurality of fundamental periods, and first multiplexing means for multiplexing a plurality of data signals which correspond to a predetermined number of fundamental periods, for producing a first multiplex data signal;
   a plurality of local stations each of which is coupled to terminal device means including at least one terminal device; and
   signal transmission path means connected between said central station and said local stations;
   said central station including transmitting means for transmitting first information which includes the first multiplex data signal on said signal transmission path means, during a transmission period having a window period which corresponds to the number of fundamental periods, on a time-division multiplexing basis, which are associated with multiplexing, said first information, including a plurality of information signals addressed, respectively, to said local stations means, each of the information signals which forms a subframe corresponding to each of said local stations and having at least one time slot which corresponds to said terminal device and has the first multiplex data signal; and
   each of said local stations being arranged to include second multiplexing means for multiplexing a plurality of data signals relative to said terminal device, in a predetermined number of fundamental periods, for producing a second multiplex data signals, and second second information including the second multiplex data signal onto said signal transmission path means in a direction of said central station at a timing depending on a propagation delay time of said signal transmission path means located between itself and said central station, said propagation delay time being measured in said window period.

2. A system according to claim 1, wherein said first information constructs a transmission frame including a subframe group having a plurality of subframes corresponding to the information signals and a window frame following the subframe group and corresponding to the window period.

3. A system according to claim 2, wherein said window period has a longer period than a maximum value of the propagation delay time.

4. A system according to claim 2, wherein said first information includes a subframe having an address data for designating one of said local stations, and each of said local stations is arranged to send a test signal to said signal transmission path means for measuring the transmission delay time, when it is deisgnated by the address data, said test signal being sent back from said central station to the corresponding one of said local stations in order to measure a transmission delay time between said corresponding one of said local stations and said central station.

5. A system according to claim 1, wherein each of said first and second multiplexing means multiplexes a plurality of audio data and a plurality of control data, each of said control data being attached to each of said audio data.

6. A system according to claim 5, wherein each of the audio data has two channels.

7. A system according to claim 1, wherein said signal transmission path means includes a down link for transmitting the information from said central station to each of said local stations, and an up link for transmitting the information from each of said local stations to said central station.

8. In a communication network system comprising a central station having a PBX which generates a fundamental signal having a plurality of fundamental periods, a plurality of local stations, each of which is coupled to at least one terminal device, and signal transmission path means connected between said central station and said local stations, a method for communicating between said central station and said local station comprising the steps of:

multiplexing a plurality of information signals which are generated from said terminal device in a predetermined number of the fundamental periods, to produce a multiplex signal;

assembling a transmission frame having a plurality of subframes, an address frame and a window frame following the subframes, said subframes being assigned to said local stations, respectively, each of which has at least one time slot having the multiplex signal, and said window frame having a window period which corresponds to said predetermined number of the fundamental periods;

transmitting the transmission frame from said central station to said local stations through said signal transmission path means;

measuring a propagation delay time of said signal transmission path means between said central station and said local stations, within the window period of the window frame included in the transmission frame; and transmitting the multiplex signal onto said signal transmission path means at a timing that depends on the propagation delay time.

9. A method according to claim 8, wherein the step of measuring a propagation delay time includes a step of sending a test signal from one of said local stations to said central station, and measuring the propagation delay time in response to the test signal sent back from said central station, within the window period.

10. A method according to claim 8, wherein the step of multiplexing includes a step of extracting the information signals which correspond to the terminal device, and are sequentially generated within the predetermined number of fundamental periods, and multiplexing the information signals on a time-division multiplexing basis.

* * * * *